Feb. 5, 1935.  J. P. ANDERSON  1,990,057
CAR CONSTRUCTION
Filed May 16, 1933     3 Sheets-Sheet 1
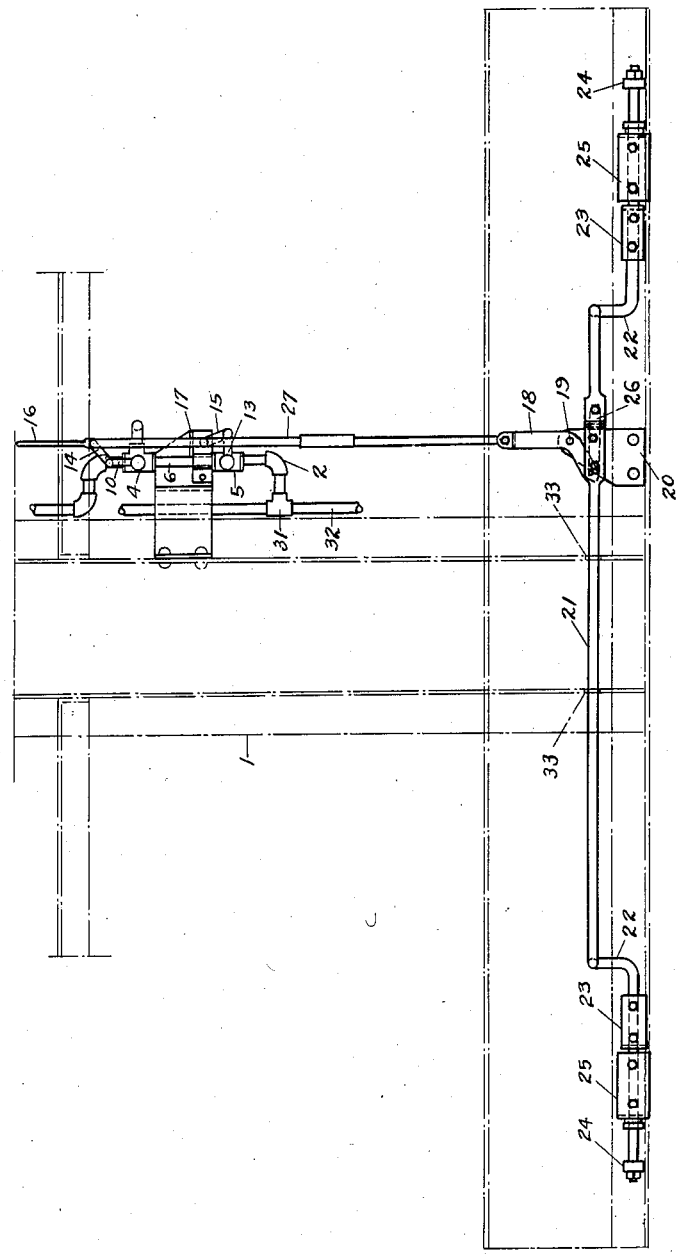
INVENTOR
John P. Anderson
BY
ATTORNEY

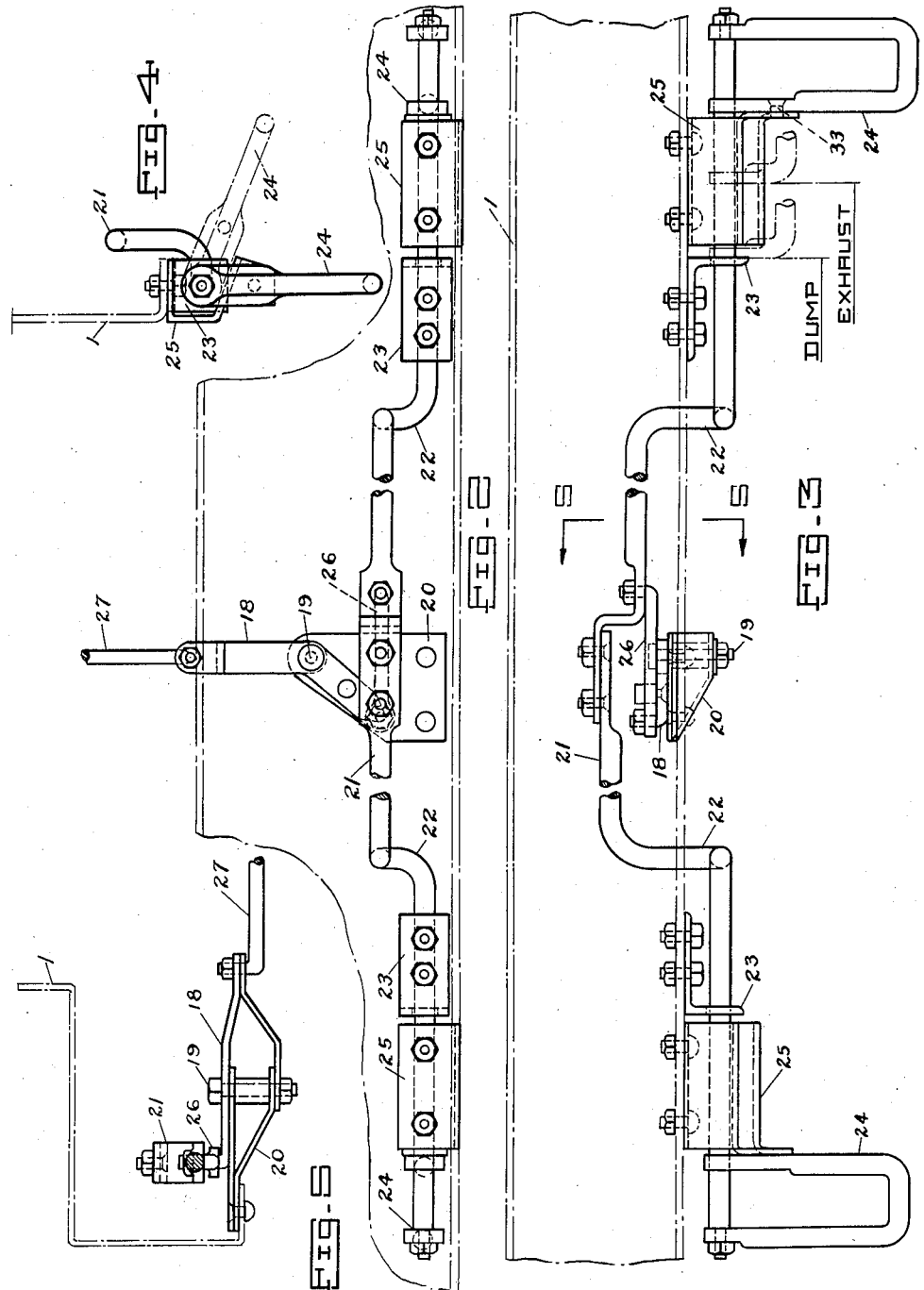

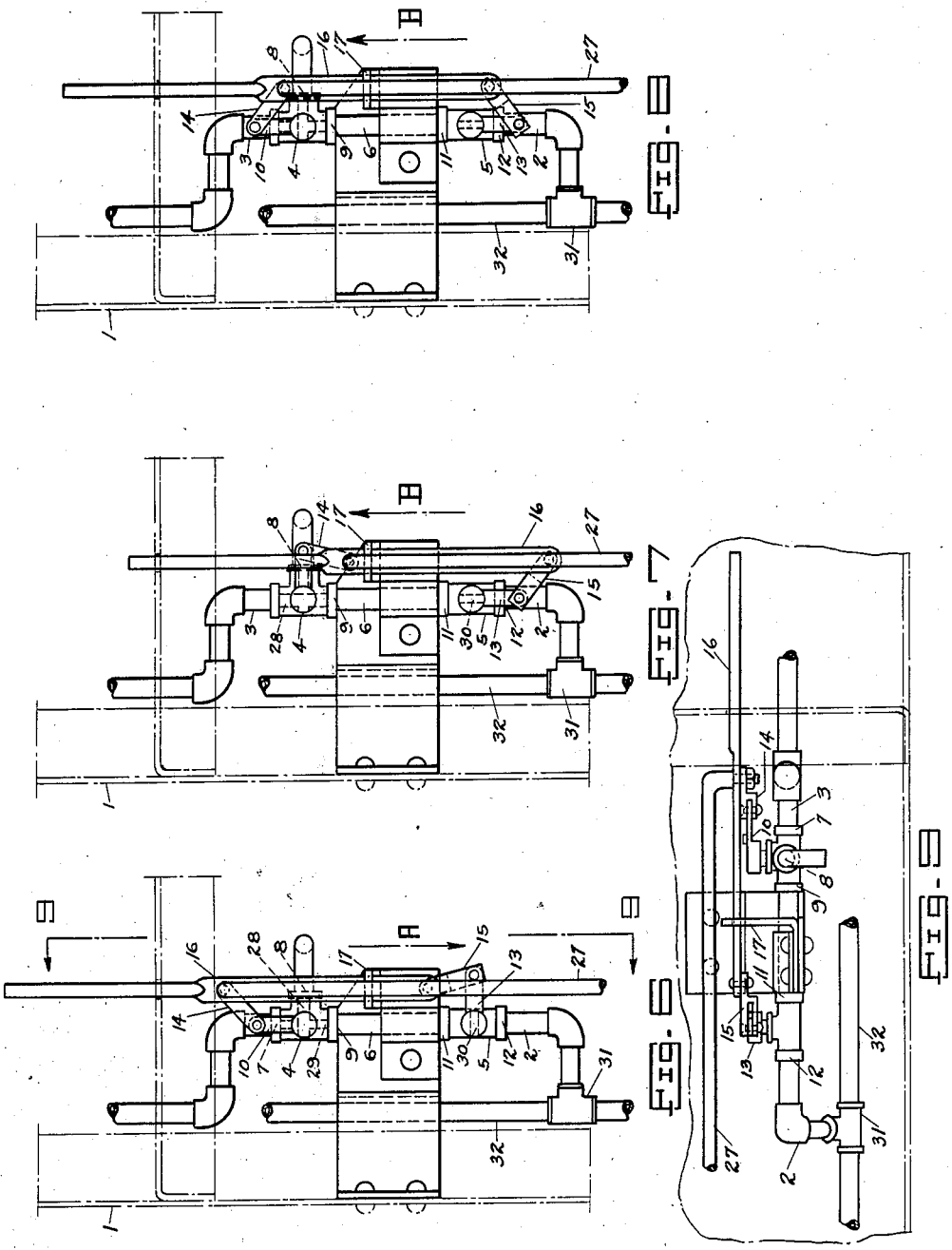

Patented Feb. 5, 1935

1,990,057

UNITED STATES PATENT OFFICE 1,990,057

CAR CONSTRUCTION

John P. Anderson, Koppel, Pa., assignor to Koppel Industrial Car and Equipment Company, Koppel, Pa., a corporation of Pennsylvania Application May 16, 1933, Serial No. 671,354

11 Claims. (Cl. 105—271)

The invention pertains to railway dump cars and more particularly to the means for controlling the fluid pressure operating the dumping cylinders.

An object of the invention is to provide means on a fluid pressure actuated dump car for controlling the fluid pressure, which means will be inexpensive, positive in operation, and simple in construction.

Another object of the invention is to provide a means for controlling the fluid pressure on a fluid pressure actuated dump car, so as to operate the dumping mechanism of an individual car in a train or to operate each of the cars in a train simultaneously.

A further object of the invention is to provide a means for controlling the fluid pressure in a railway dump car which means is operable from either side of the car.

Another object of the invention is to provide a means for controlling the fluid pressure in a railway dump car which is self-indicating as to the position of the various members controlling the direction of flow of the pressure within the car actuating mechanism and which prevents accidental operation of the car dumping mechanism.

It will be understood throughout the following specification, that the herein described invention is adapted for use on dump vehicles and particularly railway dump cars. Such a vehicle comprises a chassis or underframe which is supported upon wheeled trucks. A body is tiltably mounted upon the under frame and a body dumping mechanism is also mounted upon the underframe. The said mechanism comprises a fluid pressure actuated body dumping cylinder, a fluid pressure actuated automatic valve for controlling the admission of fluid pressure to and the exhaustion of pressure from the body dumping cylinder. A fluid pressure storage reservoir is mounted upon the underframe and the present invention provides a means for controlling the flow of fluid pressure from the reservoir into the said automatic valve to control the operation thereof. The type of valve referred to is such as is illustrated in U. S. Patent #1,777,821 granted October 7, 1930.

For the purpose of facilitating the description of the present invention the mechanism hereinafter to be described and claimed has for convenience been divided into two parts. The portion directly operating the valves of the invention and the valves themselves which control the flow of the fluid pressure have been designated as the operating mechanism; and the arrangement of levers for controlling the valve operating mechanism and valves, have been designated as the control mechanism, it being understood that the operating and control mechanisms combined form a unit for controlling the admission of the fluid pressure to the body actuating mechanism of a car. It will also be obvious to those skilled in the art that various changes can be made in either the operating or control portions of the herein described mechanism and substitutions can be made for either the operating or control portion of the mechanism without departing from the scope of the appended claims.

To further facilitate the understanding of the invention and the description thereof the various positions of the operating and control portions of the mechanism will be described as the running or neutral position, the dump position, and the exhaust position. The neutral position designates the position of the various members of the mechanism of the invention when the body of the car is in horizontal or lading retaining position; the dump position refers to the position of the various members of the mechanism when in position to admit fluid pressure to the body dumping mechanism; and the exhaust position refers to the position of the various members of the mechanism when in position to exhaust pressure from the operating line so as to permit the dumping mechanism to exhaust the pressure from the body tilting cylinders.

Referring now to the drawings, Fig. 1 is a plan view of a portion of a car underframe embodying the invention in neutral position; Fig. 2 is an enlarged view of the control portion of the mechanism in neutral position; Fig. 3 is an enlarged end view of the control portion of the mechanism in neutral position; Fig. 4 is an enlarged side elevation of the control portion of the mechanism in neutral position; Fig. 5 is a section on line 5—5 of Fig. 3; Fig. 6 is an enlarged view of the operating portion of the mechanism in neutral position; Fig. 7 is an enlarged view of the operating portion of the mechanism in dumping position; Fig. 8 is an enlarged view of the operating mechanism in exhaust position; and Fig. 9 is a section along line 9—9 of Fig. 6.

Referring now to the drawings where like reference characters refer to like parts, reference character 1 indicates a portion of the car underframe, 2 the operating line carrying fluid pressure to operate the dumping mechanism control valve and 3 the line leading from the fluid pressure storage reservoir to the operating portion of the mechanism of the present invention.

The operating portion of the mechanism comprises two standard type plug valves 4 and 5 connected together by a nipple 6, the valve 4 being known as a three-way valve and the valve 5 being a two-way valve. To the inlet 7 of the valve 4 is connected the line 3 leading from the reservoir; to the outlet 8 is connected a short piece of pipe through which the fluid pressure within the operating line and valves 4 and 5 exhausts to the atmosphere; and to the outlet 9 is connected the nipple 6. On the exterior of the body of the valve 4 is a handle 10 which is connected to the three-way plug within the valve 4. To the inlet 11 of the valve 5 is connected the nipple 6 and to the outlet 12 is connected the line 2. On the outside of the body of the valve 5 is a handle 13 connected to a two-way plug within the valve 5. Pivotally mounted on the handles 10 and 13 respectively are links 14 and 15 which links are connected by the member 16. A suitably disposed bracket supports the valves 4 and 5 and contains a guide 17 which engages with the member 16 retaining it in operative position.

The control portion of the mechanism comprises a bell crank 18 pivotally mounted at 19 on a suitably formed bracket 20 secured to one end of the car underframe 1. A member 21 is disposed transversely of the car having angularly disposed offsets 22 at each end thereof disposed adjacent the sides of the car and slidably supported in brackets 23. At each end of the member 21 and pivotally mounted on the offsets 22 are operating handles 24 which are retained in position by means of stops 25 mounted on the ends of the underframe 1. These stops are so disposed as to prevent movement of the member until after the handle 24 is rotated into a position free of the stop 25. The member 18 is connected to the member 21 by means of the link 26 which has its end portions pivotally mounted on the members 18 and 21. Connecting the operating and control portions of the mechanism is a tie 27 having its end portions pivotally connected to the member 16 of the operating portion and the bell crank 18 of the control portion of the mechanism.

Proceeding now with the description of the mode of operation of the operating and control portions of the mechanism, the operation of each will be described separately and it is to be understood that when the operating and control portions are connected together by the tie 27 and the control portion of the mechanism is moved to neutral, exhaust or dump positions, the operating portion of the mechanism will also be moved into corresponding neutral, exhaust or dump positions.

Referring now to Figs. 6, 7 and 8 which illustrate the various positions of the operating portion of the mechanism, Fig. 6 shows the various members when in running or neutral position. Here the valve 4 is closed and as will be observed from the dotted indications of the ports in the valve plugs, the port 28 connects to the exhaust outlet 8 and the port 29 connects the outlet 9 to the exhaust outlet 8. Obviously therefore any fluid pressure leaking past the valve plug would exhaust to the atmosphere through the ports 28 and 29 and any fluid pressure in the pipe 6 would also exhaust through the ports 28 and 29 to the atmosphere. The valve 5 is also closed as will be seen from the dotted indication of the port 30 which is closed so as to cut off the flow of fluid pressure between the pipes 6 and 2.

With the valves in this position, there can be no possibility of fluid pressure from the reservoir building up in the operating line 2 and accidentally actuating the body dumping mechanism. Likewise, by having the valves connected by a T 31 to the operating line 32 the operating line of each car in a series can be connected and the whole series of cars operated independently of the individual control mechanism. It is to be understood that the usual practice is to have the operating lines 32 of adjacent cars disconnected when the cars are being operated individually.

When it is desired to actuate the body dumping mechanism of any individual car, the member 16 is moved, by means of the control mechanism, in the direction of the arrow A which brings the members into dump position as shown in Fig. 7. This movement of the member 16 carries with it the links 14 and 15 which in turn cause rotation of the handles 10 and 13 of the valves 4 and 5 into the position shown in Fig. 7. By reference to this latter figure it will be observed that the three-way plug of the valve 4 has been turned so as to connect the port 28 of the valve plug with the lines 3 and 6 and disconnect the exhaust outlet 8 from the plug. In this position fluid pressure from the reservoir passes from the pipe 3 through the valve 4 into the line 6. The valve 5 has had its plug rotated into a position to connect the port 30 with the lines 6 and 2 so that the fluid pressure within the line 3 flows from the reservoir through the valve 5 into the line 2 and thence through the operating line 32, actuating the control valve of the body dumping mechanism.

When it is desired to right the body of the car the member 16 is moved, by the control portion of the mechanism, in the direction of the arrow B which brings the valves into exhaust position as shown in Fig. 8. Referring now to Fig. 8 it will be observed that the link 15 connecting the handle 13 of the valve 5 has permitted movement of the member 16 independent of the handle 13 of the valve 5 so that the plug of the valve 5 remains in position connecting the lines 2 and 6. The handle 10 of the valve 4, however, has been rotated into a position so as to turn the three-way plug of the valve 4 to disconnect the line 3 from the reservoir and to connect the exhaust outlet 8 to the line 6 between the valves 4 and 5. It is obvious that with the valves 4 and 5 in this position the fluid pressure within the operating line 32 is permitted to exhaust through the lines 2 and 6, thereby permitting the control valve of the dumping mechanism to exhaust the pressure from the dumping cylinders and right the car body.

To return the operating mechanism to the neutral or running position the member 16 is further moved in the direction B into the position shown in Fig. 6. During this movement of the member 16 it will be observed that the link 14 connecting the handle 10 of the valve 4 has permitted the member 16 to move without affecting the final setting of the handle 10, thereby retaining the plug of the valve 4 in position to exhaust the fluid pressure within the line 6 between the valves 4 and 5. This movement of the member 16 has, however, carried the plug of the valve 5 into the position shown in Fig. 6 so as to disconnect the lines 6 and 2 entering the valve 5.

From the above description it will be apparent that by means of a lost motion device comprised of the members 14, 15 and 16 it has been possible to obtain through the use of standard plug valves a combination which efficiently performs the function and work of a more expensive and special control valve heretofore used for this purpose in dump cars of the character herein described.

Referring now to Figs. 2, 3 and 4 illustrating the various positions of the control portion of the mechanism, it will be observed that Fig. 2 illustrates the position of the mechanism when in neutral or running position in which the member 18 through the tie 27 connecting the member 16 of the operating portion of the mechanism, holds the operating portion of the mechanism also in neutral position as shown in Fig. 6. As has hereinbefore been stated the control portion of the mechanism may be operated from either side of the car and for this purpose the operating handles 24 and stops 25 have been so disposed as to permit the operation of the member 18 from either side of the car and to effect from either side of the car an identical movement in the member 16. It will be observed upon reference to Fig. 2 that when the control and operating portions of the mechanism are in neutral position the handles 24 abut against the stops 25 preventing movement of the handles 24 transversely of the car, thereby preventing movement of the member 18 of the control portion of the mechanism. For the purpose of insuring against tampering with the control mechanism, registering apertures 33 have been formed in the members 24 and 25 so as to permit the insertion of a locking pin, thereby locking the mechanism in the position shown.

When it is desired to move the mechanism into dumped position the locking pins are removed and assuming the operator is standing at the right side of the car as illustrated in Fig. 2, the handle 24 is grasped and rotated inwardly of the car, out of engagement with the stop 25 and in this position the handle and its attached member 21 is moved inwardly transversely of the car until the handle engages with the bracket 23. This position of the mechanism is shown in dotted lines on Fig. 4 and would cause the valves 4 and 5 and their mechanism to move from the position shown in Fig. 6 to that shown in Fig. 7. Upon referring to the left side of Figs. 2 and 3 it will be observed that as the member 21 is a continuous member, the handle 24 will move outwardly, away from its corresponding stop 25. It will, of course, be obvious that the handle 24 on the left side of the car could not have been moved outwardly to actuate the control mechanism without a rotation of the opposite handle 24, as it would have been prevented by the engagement of the handle 24 and stop 25 on the right side of the car.

When it is desired to move the operating portion of the mechanism into exhaust position as shown in Fig. 8 of the drawings, the operator moves the handle 24 on the right side of the car to a position midway of the two extreme positions as shown in dot and dash lines on Fig. 3. After the car body has been righted as previously described the operator then moves the handle 24 to its extreme outward position and allows it to assume a vertical position behind the stop 25 and the mechanism is now returned to a neutral or running position as shown in Figs. 1, 2 and 6 of the drawings.

Should the operator desire to operate the car from the left side, he would grasp the handle 24 on the left side of the car and repeat the operations previously described. Upon reference to Figs. 1 and 2 of the drawings it will be obvious that, although the movement of the member 18 will now be the reverse of that previously described the movement of the members 10, 13, and 16 of the valve will be the same. This result is obtained by the manner in which the member 18 is disposed in relation to the member 27, so that the member 18 imparts the same movement to the member 27 and which is independent of the direction of movement of member 21. In this connection it will be observed that the member 21 passes through slots 33 in the center sills of the car as shown in Fig. 1 thereby preventing displacement of the member 21 longitudinally of the car and retaining the members 21, 26 and 18 in position to obtain the result above described.

Having thus described the invention, what I claim as new and desire to secure by Letters Patent is:

1. In a device of the character described, in combination, a pair of valve bodies having rotatable ported plugs, jointed link means connecting said valve plugs, a valve control member disposed transversely to said link means, a bell crank, a connection between one arm of said crank and said link means and a connection between the other arm and said valve control member, said arm connected to said link means being in line with the connecting member when the valve control member is in neutral position.

2. In a device of the character described, in combination, a pair of plug valves, a jointed link connection between said valve plugs, an operating means for said valve and a connection between said operating means and link connection, said link connection being so disposed as to impart movement alternately to each valve plug upon actuating said operating means.

3. In a dump car valve control device of the character described, in combination, a member disposed transversely of the car and accessible from either side thereof, operating handles pivotally mounted on each end of said member, a stop adjacent each handle and having an abutting face disposed in part on the arc of movement of said handle, a bell crank engaging intermediate the ends of said member and a connection between said bell crank and valve.

4. In a dump car valve control mechanism of the character described, in combination, a member disposed transversely of said car, operating handles pivotally mounted on each end of said member, a stop behind each handle and partly embracing said member, a bell crank, a connection between said bell crank and valve and a connection between said bell crank and intermediate portion of said member.

5. In a device of the character described, in combination, an operating arm, spaced stops, handles pivotally mounted on said arms and embracing oppositely disposed faces of said stops, a valve and a connection between said valve and operating arm, said operating arm handles when in normal position acting through said stops to retain said operating arm and valve in neutral position, and either handle upon being rotated to a position free of said stop being adapted for effecting movement of said operating arm and valve.

6. In a device of the character described, in combination, a valve and a valve control arm, handles on opposite ends of said arm, a connection between said valve and operating arm, said connection effecting operation of said valve when the operating arm is actuated by means of either handle, and spaced stops disposed between said handles, said stops and handles being so disposed as to normally lock said arm in fixed relation to said valve and to release said arm upon rotation of one of said handles.

7. In a device of the character described, in combination, a valve mechanism and a control mechanism having a lever disposed transversely to said valve mechanism, said valve mechanism comprising a pair of connected plug valves, handles on said valve plugs, a link means between said handles and a connection between said control mechanism lever and said valve handle link means.

8. In a device of the character described, a valve mechanism and a valve control mechanism, said valve mechanism comprising a three-way plug valve and a two-way plug valve, a connection between said valves, rotatable plugs in said valves, operating handles on said plugs and a jointed link connection between said valve plug handles, and a connection between said valve and control mechanism, said link connection effecting an alternate rotation of said valve plugs upon actuation of said control mechanism.

9. In a device of the character described, in combination, a pair of standard valves, a connection between said valves, a rotatable three-way ported plug in one of said valves, a two-way ported plug in the other valve, a lost motion device connecting the plugs of said valves, said lost motion device effecting alternate rotation of said plugs in either direction.

10. In a control device of the character described, in combination, a pair of standard plug valves, a connection between said valves, a connection from one of said valves to a fluid pressure source, a connection on the other of said valves to an operating pressure line, an exhaust port in said first mentioned valve, rotatable ported plugs in said valves and means for simultaneous operation of said valves to connect the fluid pressure source and operating line and to alternately disconnect the operating line from the fluid pressure source and connect it to the exhaust outlet through the medium of said plugs.

11. In a device of the character described, in combination, a pair of connected standard plug valves, a fluid pressure source, an operating line, said operating line being connected through said valves to said fluid pressure source, jointed link connections to the plug of each valve, a member joining said link connections, a transversely disposed control bar, a bell crank and a connection between said bell crank, control bar and said member.

JOHN P. ANDERSON.